(12) United States Patent
Radisek et al.

(10) Patent No.: US 8,328,677 B2
(45) Date of Patent: Dec. 11, 2012

(54) ROBUST TOOTH FORMS FOR GEARING SYSTEMS

(75) Inventors: Theodore Radisek, Aurora, OH (US); Merritt A. Osborn, Chagrin Falls, OH (US)

(73) Assignee: Gearing Solutions, Inc., Solon, OH (US)

( * ) Notice: Subject to any disclaimer, the term of this patent is extended or adjusted under 35 U.S.C. 154(b) by 238 days.

(21) Appl. No.: 12/884,660

(22) Filed: Sep. 17, 2010

(65) Prior Publication Data

US 2011/0070993 A1   Mar. 24, 2011

Related U.S. Application Data

(60) Provisional application No. 61/243,691, filed on Sep. 18, 2009, provisional application No. 61/323,916, filed on Apr. 14, 2010.

(51) Int. Cl.
*F16H 9/26*   (2006.01)
*F16H 57/08*   (2006.01)

(52) U.S. Cl. ........................................ 475/182; 475/344

(58) Field of Classification Search .................. 475/182, 475/344

See application file for complete search history.

(56) References Cited

U.S. PATENT DOCUMENTS

| | | | | |
|---|---|---|---|---|
| 5,456,638 | A | * | 10/1995 | Osborn ........................ 474/155 |
| 7,591,746 | B2 | * | 9/2009 | Tarnopolsky et al. ........ 474/155 |
| 2006/0035739 | A1 | * | 2/2006 | Osborn et al. ................ 474/155 |

* cited by examiner

*Primary Examiner* — Edwin A Young
(74) *Attorney, Agent, or Firm* — Patrick J. Daugherty; Driggs, Hogg, Daugherty & Del Zoppo Co., LPA

(57) ABSTRACT

Embodiments provide for planetary gearing systems with ring gears comprising cylindrical tooth forms arrayed from a central axis and encompassing at least one planetary sprocket and a sun gear. The sun and ring gears have cylindrical tooth forms. The planetary sprocket teeth are aligned for engagement with at least one of the sun gear and ring gear cylindrical tooth forms at a contact radius from the central axis selected as a function of the sprocket tooth common involute gear shape, the sprocket radius, the sprocket tooth pitch, and of the pitch, gear radius and cylindrical form diameter of the selected at least one gear cylindrical tooth forms.

13 Claims, 6 Drawing Sheets

ROBUST TOOTH FORMS FOR GEARING SYSTEMS

CROSS-REFERENCE TO RELATED APPLICATIONS

This application claims the benefits of the following provisional patent applications previously filed in the United States Patent and Trademark Office by common inventors Merritt A. Osborn and Theodore Radisek: "BALANCED SUN AND RING GEAR FORMS FOR PLANETARY GEARING," filed Sep. 18, 2009, Ser. No. 61/243,691, Confirmation No. 4357; and "ROBUST TOOTH FORM GEARING SYSTEM," filed Apr. 14, 2010, Ser. No. 61/323,916, Confirmation No. 7640.

BACKGROUND

One gearing structure that provides superior common normal, rolling contact and low friction attributes during force transfer is a sprocket and roller system, wherein solid sprocket gear teeth engage roller elements (e.g. on a roller chain, or a plurality of rollers arrayed and attached to another gear element such as a disc, cylinder, etc.). Such systems have many economic and design advantages. Frictional problems are minimized by the rolling interaction of rollers with respect to interfacing sprocket gear teeth, and many lubrication options are possible. A well known chain and sprocket system for variable speed reduction and torque transmission is a bicycle "derailleur" system, where speed and torque outputs are chosen by selecting from a group of input and output sprocket gears sharing a common chain.

In the interaction of gear elements driven by gear teeth in speed reduction and torque transmission, it is desirable to have a common normal orientation of the respective contacting surfaces intersecting a line of centers at all times, a fundamental principle sometimes known as the "common normal" principle. Gear profiles that do not satisfy this principle may not have a constant angular velocity ratio. A driving first gear may revolve at a constant rate (RPM), but a failure to maintain the common normal during the entire interaction with a driven gear contact element results in varying output revolution rate and torque transmission behavior. The driven gear may speed up and slow down instead of rotating smoothly and constantly responsive to a constant rotational input of the first gear.

Planetary power transmission composite gear structures are known for torque and speed reduction and increasing applications. Rotation of a circular "sun" gear about its central axis with rotation speed and torque engages one more "planetary" gearing element(s) disposed about the sun gear, wherein if more than one planetary gear is provided, said planetary gears are generally arrayed about the sun gear central axis. The planetary gears in turn responsively engage a "ring" gear disposed about the sun gear and the planetary gears generally arrayed about the sun gear central axis. In application, a rotational motion input through one of the ring gear and sun gear elements is translated through the planetary gearing element(s) into a rotational motion output by the other of the sun and ring gears at either an increased speed and reduced torque or a reduced speed and increased torque output.

The performance capabilities of sprocket-and-roller planetary systems may be limited relative to other systems, such as meshed fixed tooth systems. In one aspect, the overall strength, force bearing or force transmission capacity of a prior art sprocket-and-roller planetary system may be lower than comparably sized meshed fixed tooth systems.

BRIEF SUMMARY

One embodiment of present invention, a planetary gearing system, has a ring gear comprising cylindrical tooth forms arrayed in a ring gear pitch on a ring gear radius from a central axis, each of the first plurality of cylindrical tooth forms having a common ring gear cylindrical form diameter. At least one planetary sprocket is encompassed by the ring gear and has sprocket teeth arrayed outward along a sprocket radius from a central sprocket axis in a sprocket tooth pitch, having a common involute gear shape, the sprocket positioned for the sprocket teeth to engage the ring gear cylindrical tooth forms. A sun driver is encompassed by the ring gear and has cylindrical tooth forms arrayed in a sun gear pitch less than the ring gear pitch on a sun gear radius from the central axis less than the ring gear radius, each of the cylindrical tooth forms having a common sun gear cylindrical form diameter, the sun gear cylindrical tooth forms positioned to engage the sprocket teeth. The at least one planetary sprocket is aligned for engagement of a specified at least one of the plurality of the sun gear cylindrical tooth forms and the plurality of the ring gear cylindrical tooth forms by the sprocket teeth at a contact radius from the central axis selected as a function of the sprocket tooth common involute gear shape, the sprocket radius, the sprocket tooth pitch, and of the pitch, gear radius and cylindrical form diameter of the selected at least one plurality of gear cylindrical tooth forms.

In another embodiment, a method for forming a planetary sprocket includes providing a ring gear with ring gear cylindrical tooth forms, each having a common ring gear outer surface diameter and arrayed in a ring gear pitch on a ring gear radius, and a sun gear having cylindrical tooth forms with a common sun gear outer surface diameter different from the ring gear outer diameter and arrayed in a sun gear pitch different from the ring gear pitch and on a sun gear radius different from the ring gear radius. A computer processor is provided in communication with a memory comprising computer instructions, the computer processor configured by the instructions to determine a sprocket tooth involute form conjugate with both of the sun and ring gear cylindrical tooth forms, a sprocket tooth pitch and a sprocket radius distance from a central sprocket axis in response to the ring gear outer surface diameter, the ring gear pitch, the ring gear radius, the sun gear outer surface diameter, the sun gear pitch and the sun gear radius.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
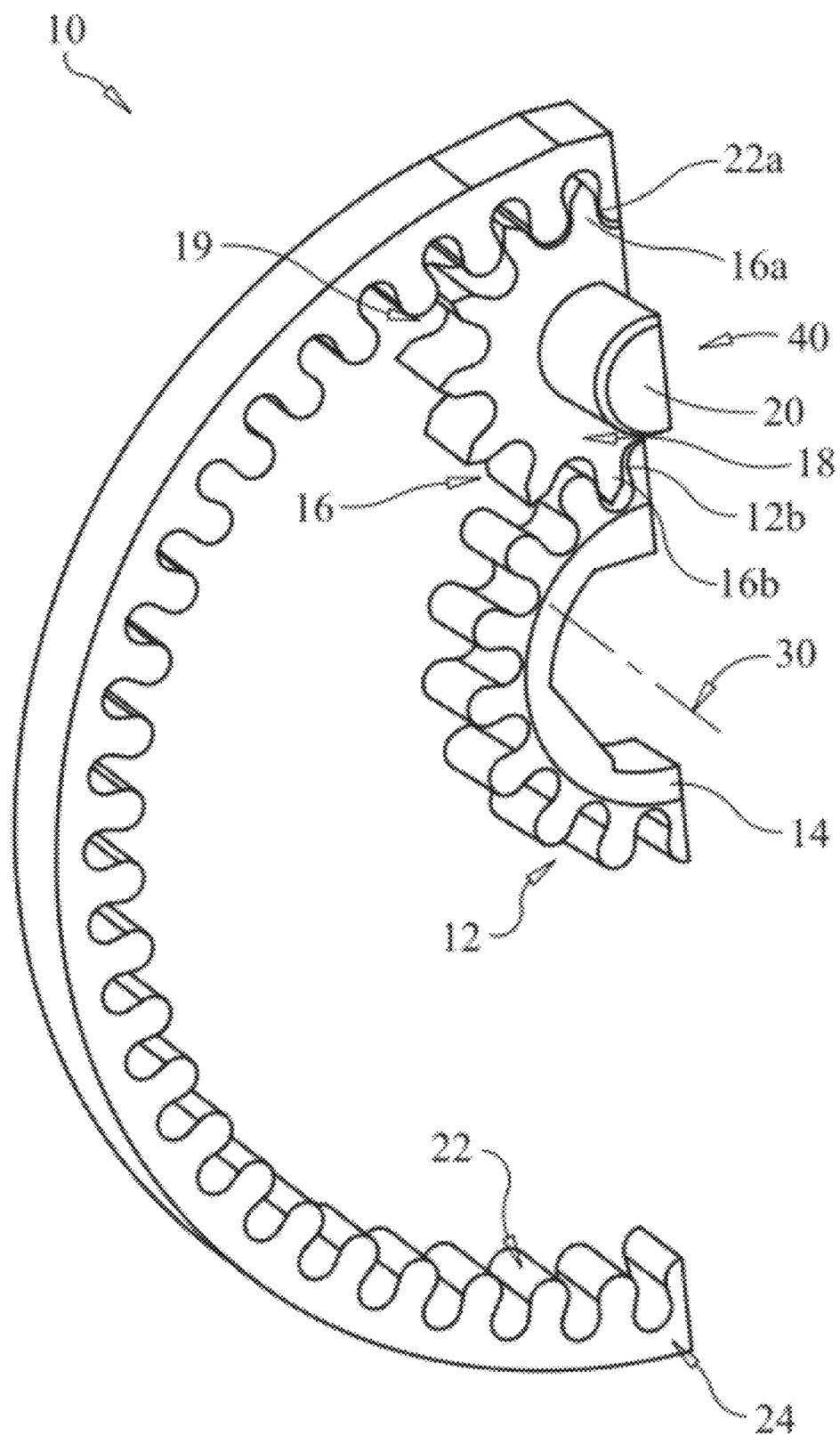
FIG. 1 illustrates an embodiment of a gearing system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In a sprocket-and-roller planetary system, appropriate system geometries in sprocket size and roller engagement are limiting. Generally, a minimum number of rollers should be fully engaged with sprocket teeth during driving operations to maintain a constant speed and rotate smoothly with respect to the sprocket. For example, in many applications, a roller chain should wrap around and fully engage at least about one-third of engaged sprocket teeth, which in turn requires that the alignment of the roller chain with the sprocket gear should define about a 120 degree angle between the chain ends about the gear. If such an alignment and engagement are not met, then a roller chain may exhibit cordal action, where relational velocities are no longer equal and the chain will start bouncing, and speed reduction and torque transfer properties of the engagement break down.

Figure 2A:
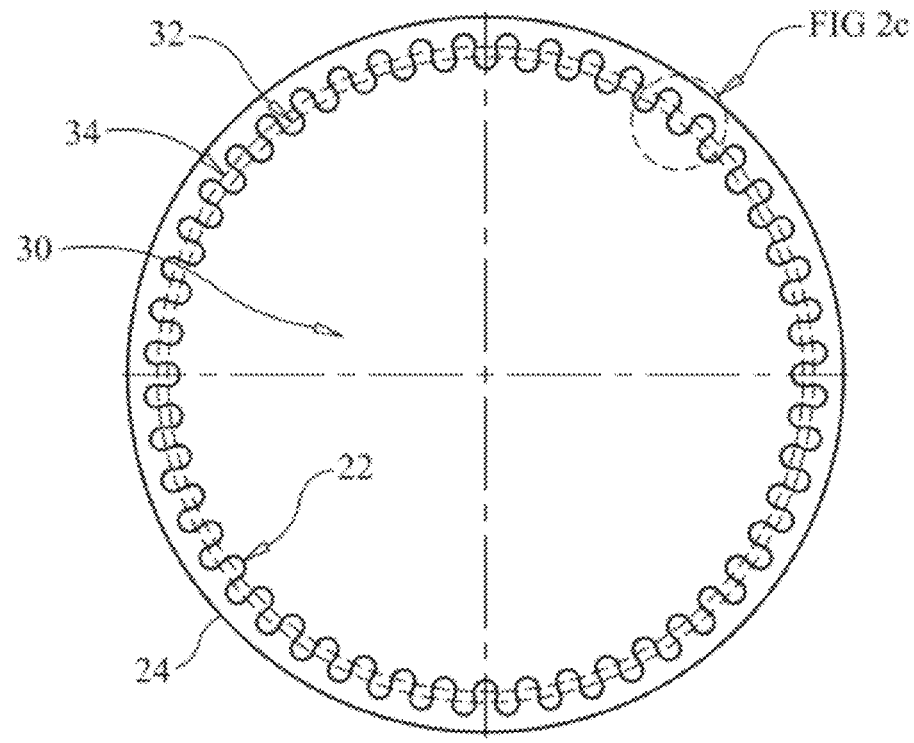
FIG. 2 illustrates views of components of the gearing system of FIG. 1.
Figure 2B:
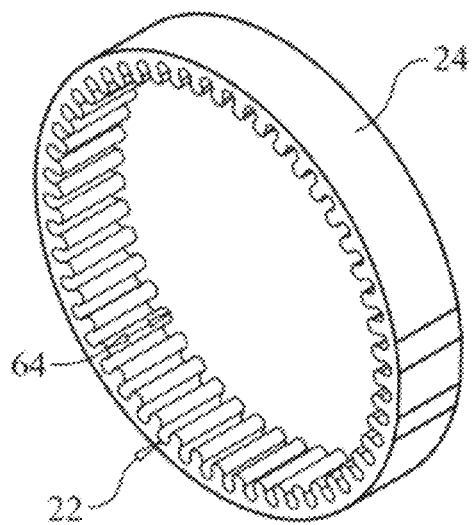
Figure 2C:
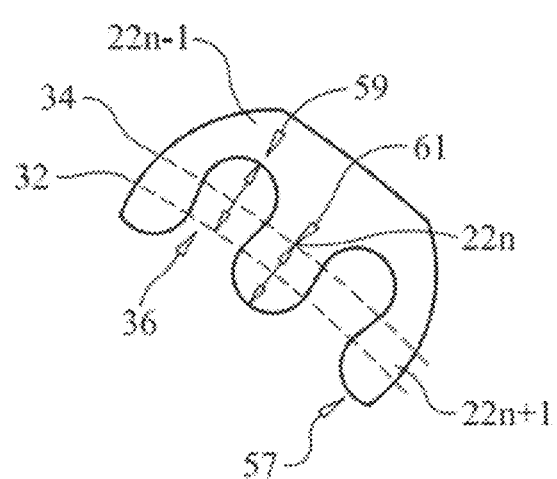
Figure 3A:
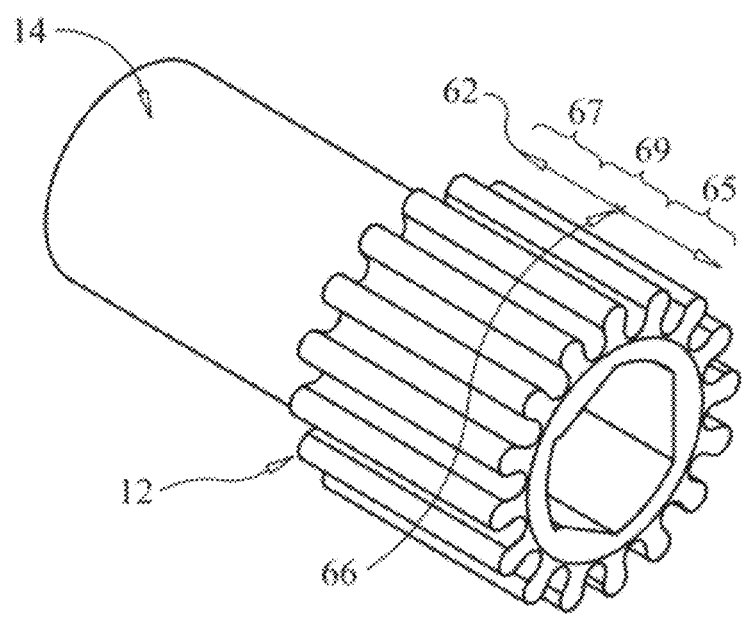
FIG. 3 illustrates views of components of the gearing system of FIG. 1.
Figure 3B:
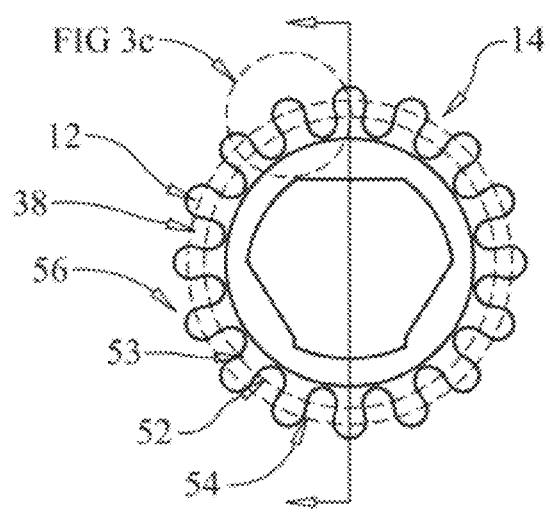
Figure 3C:
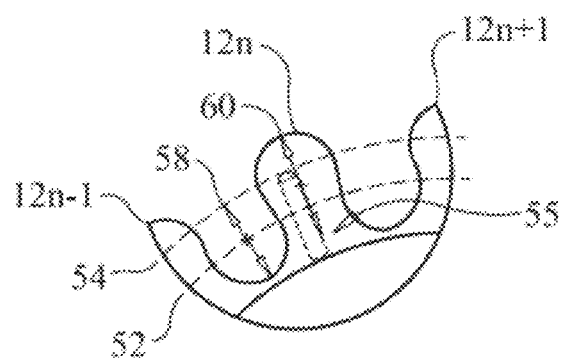

FIG. 1 illustrates a perspective sectional view of a portion of a planetary gearing system 10 according to the present invention, comprising a ring gear 24, at least one planetary sprocket gear 18 and a sun gear 14; for clarity of illustration, some elements of the system are omitted, such as bearings, input and output housings and elements, etc., but the application of such omitted elements will be readily apparent to one skilled in the art. FIGS. 2a-2c provide additional views of the ring gear 24, and FIGS. 3a-3c provide additional views of the sun gear 14. The ring gear 24 comprises a first plurality of cylindrical tooth forms 22 arrayed in a ring gear 24 pitch (the number of tooth forms within a given dimensional length, of the total number of forms on the respective gear), wherein the pitch is here defined with respect to expected engagement of the sprocket gear tooth forms 19 on the planetary sprocket gear 18. The present embodiment defines the ring gear 24 pitch with respect to ring/sprocket gear engagement radii 32 and 34 from a central axis 30, as is more fully described below.

The planetary sprocket(s) 18 is/are encompassed by the ring gear 24 and located about a central planetary pin 20 and comprises a plurality of sprocket teeth 16 arrayed outward along a common radius from a central axis 40 common to the sprocket 18 and the cylindrical planet pin 20. In some embodiments, the planetary sprocket teeth 16 are generally configured to drive a rotational output of the sun gear 14 about the central axis 30 at an increased output speed and decreased torque relative to an input speed and torque of the planetary pin 20 about the central axis 30, as a result of the planetary sprocket teeth 16 engaging the ring gear tooth forms 22. In another application, the planetary sprocket teeth 16 are generally configured to drive a rotational output of the planetary pin 20 about the central axis 30 at a decreased output speed and increased torque relative to an input speed and torque of the sun gear 14 about the central axis 30, again as a result of the planetary sprocket teeth 16 engaging the ring gear tooth forms 22. Alternative embodiments may provide for different driving and driven elements of the respective gearing elements 14, 18, 20 and 24 as will be appreciated by one skilled in the art.

Forming and aligning the sprocket(s) 18, ring gear 24 and sun gear 14 into a generally conjugate engagement during their rotational interaction may improve gearing system 10 performance, for example by minimizing sliding and rubbing action during force and speed transmission and thus improving operating efficiencies. Conjugate gear alignment may also produce a uniform velocity ratio: when an input gear device rotates at a constant speed, the mating output gear will also rotate at a constant speed. Thus, it may be desirable for a planetary sprocket tooth shape to correspond to sun or ring gear rollers in order to maintain the common normal at the contacting surfaces, the tooth shape correlating to the sun and ring gear rollers responsive to the nature and duration of their contact. Accordingly, in some embodiments, the sprocket(s) 18, ring gear 24 and sun gear 14 are aligned into a generally conjugate engagement along either or both of the deeper ring/sprocket gear engagement radius 34 from a central axis 30 and the sun/sprocket gear engagement radius 52 from the central axis 30.

The planetary sprocket teeth 16 may have an involute curve tooth shape appropriate for engaging at least one of the sun gear tooth forms 12 and the ring gear tooth forms 22. An appropriate involute tooth form for a given roller gear may be defined by a string projecting from the edge of a circle defined by cross-section of the cylindrical at least one sun gear tooth form 12/ring gear tooth form 22 as unwinding from the circle, wherein a portion of the line between the end projecting from the circle and a point along the circle intersected by a radius of the circle parallel to the line end will trace out an involute curve, as will be apparent to one skilled in the arts. Conventional conjugate involute sprocket gear tooth shapes are known; for example, American National Standards Institute (ANSI), American Standards Association (ASA) and American Gear Manufacturers Association (AGMA) standards provide for selecting involute gear tooth forms responsive to the gear size and interaction parameters. Accordingly, in order to ensure conjugate gear alignment, and/or that minimum numbers of circular cross-section sun or ring gears are fully engaged with sprocket teeth during driving operations, the planetary system 10 may be constructed for a speed and torque reducer or increaser application by selecting roller gear sun and ring gear forms 14/24 with a common circular cross-section diameter 60/61 and on pitches selected to conform to specified, respective planetary sprocket gear involute forms 16. For example, ASA B.291-1963 provides for the selection of sprocket tooth forms 16 in response to pitch, number of sprocket teeth and roller chain roller diameters where roller chains are used for ring or sun gears.

Accordingly, in some embodiments of the present invention, a common involute gear shape is selected for the sprocket teeth 16 to optimize conjugate or other engagement of at least one of the ring gear tooth forms 22 and the sun gear tooth forms 12. In the embodiment illustrated in FIGS. 1, 2a-2c and 3a-3c, solid metal cylindrical tooth forms are used for the ring gear tooth forms 22 and the sun gear tooth forms 12, respectively, with outer engagement surfaces 56 and 57 that may be hardened. Thus, as illustrated in FIG. 3c, the sun gear tooth forms 12 present outer engagement surfaces 56 defined along cylindrical diameters 60. As the tooth form 12n outer surface 56 transitions to each adjacent tooth forms 12n+1 and 12n−1, it defines a required sun tooth gullet 38 along a sun tooth gullet diameter 58 generally in common with the tooth form 12n outer engagement surface cylindrical diameter 60. The gullets in these diagrams have been simplified to circular form for simplicity in illustration. Similarly, as illustrated in FIG. 2c, the ring gear tooth forms 22n may present outer engagement surfaces 57 defined along cylindrical diameters 61 and which transition to each adjacent tooth form 22n+1 and 22n−1 by defining a ring tooth gullet 36 along a ring tooth gullet diameter 59 generally in common with the tooth form 22n outer engagement surface cylindrical diameter 61. Again, the gullets in these diagrams have been simplified to circular form for simplicity in illustration.

The tooth form diameters 58, 59, 60 and 61 may thus be selected and arrayed with respect to the central axis 30 of the gearing system 10 to ensure conjugate gear contact alignment with the involute sprocket teeth 16 in order to produce uniform velocity ratio, wherein when an input gear device rotates at a constant speed, the mating output gear will also rotate at a constant speed. This alignment also generally enhances force engagement and transfer relative to non-conjugate alignment (for example, shallower engagements such as those provided by either or both of the ring/sprocket gear engagement radius 32 from a central axis 30 and the sun/sprocket gear engagement radius 54 from the central axis 30). However, in another aspect of the present invention, the depth of engagement of the sprocket teeth 16 with either of the ring gear tooth forms 22 and the sun gear tooth forms 12 may be varied or otherwise selected as a function of providing alternative operation characteristics.

For example, moving the alignment of the engagement of the planetary teeth 16 into a shallower penetration of the sprocket tooth form gullets 19 at either ring/sprocket gear engagement radii 32 or 54, and thus into a less conjugate engagement with the cylindrical ring or sun gear tooth forms 22, 12, may reduce chatter, noise and vibration in the operation of a planetary gearing system 10 but still provide robust operational strength by the gearing system 10. This may be beneficial with respect to speed increasing applications, and in particular providing for quieter and smoother performance.

In one aspect, operative strength and operational life of the gearing system 10 is enhanced by utilizing solid metallic cylindrical structures for the ring and sun gear tooth forms 22, 12, compared to conventional roller chain and other roller forms, and in particular where the shallower contact radii 54, 32 are selected (e.g. for quieter operations and less vibrations relative to the deeper radii 52, 34). It will be understood that the adjective "solid" as used with respect to the ring and sun gear tooth forms 22, 12 denotes a contiguous construction with the rest of the body forming the respective ring or sun gears 24, 14. More particularly, solid cylindrical ring and sun gear tooth forms 22, 12 according to the present invention may comprise hollow lobes wherein a central hole or aperture 55 is defined within either of the lobe forms 22, 12. Hollow lobe form 22, 12 embodiments have been found to provide improvements in strength of about eight times over the strength of roller gears of similar outer surface dimensions, thus providing for corresponding increases in durability and service life. Hollow lobe form 22, 12 embodiments also provide for an increase in strength, durability and service life relative to solid, continuous forms without central holes or apertures.

More particularly, wherein roller gears may spread forces to stress points over a broad concave area, solid gear forms instead have major stress points in the corners of their gullets, for example the forces generally concentrated at corners 53 at the base of each solid, lobed tooth 12. The geometry of hollow lobe forms 22, 12 allows said forces concentrated at the gullet corners to be translated into vectors better supported by the walls of the hollow lobe form over the contiguous material in continuous-formed solid gears without apertures/holes. Testing of embodiments of hollow lobe forms 22, 12 according to the present invention has found them about 9% stronger than continuous-formed solid gears without apertures/holes of similar metal material, with failure occurring by material cracking, not at the gullet base 53 but at outer tip areas of the globular outer surface 56. In another aspect, conventional continuous-formed solid gears without apertures/holes may be aligned to engage sprocket teeth in a cantilevered arrangement with their base structures in order to enhance their overall strength: the hollow gullet stalk form of the present invention provides similar same or greater strength enhancement, and thus there is no need to provide for cantilevering in gear formation or alignment.

In another aspect of the present invention, providing solid lobe ring and sun gear forms 22, 12 enables extension of the length of the sprocket gear teeth 16 relative to conventional gearing arrangements. The solid lobe shape allows the gullets 38 to be deeper for deeper sprocket involute tooth 16 penetrations and thus a corresponding larger surface area engagement of the outer lobe surface 56, relative to rollers. Limits on possible gullet depth penetration for engagement of roller gear forms typically limits the contact ratio to a maximum of 1.7, wherein the solid lobe gear forms 22, 12 according to the present invention enable larger contact ratios, in one embodiment of 2.4. Furthermore, extending the length of the sprocket gear teeth to take advantage of the deeper gullet 38 penetration also provides for a logarithmic increase in sprocket tooth 16 strength: in one example, a 10% longer sprocket tooth 16 may have 25%-30% greater strength over a smaller tooth 16 of similar involute shape and metal material formation.

However, it will be appreciated that alternative ring or sun gear tooth forms 22/12 may also be utilized, such as roller chain and rollers disposed to rotate upon pins through bearings, bushings, lubricants, etc. Roller chain; roller pins; fixed pins, etc., and the present invention is not limited to the embodiments illustrated or otherwise discussed in detail.

Referring again to FIG. 1, as a planetary gear tooth 16b forcibly engages a sun gear tooth form 12b, another planetary gear tooth 16a on the opposite side of the planetary gear forcibly engages a ring gear tooth form 22a, with operative loads generally spread evenly between the teeth/form 16a-22a and 16b-12b interactions. This means that if one of the teeth/form engagements 16a-22a and 16b-12b is structurally weaker than the other, the weaker one will establish a tolerance or limit of the overall capability of the planetary gearing system 10. If cylindrical gear forms with a common diameter are used for the ring and sun gears 24 and 14, which is generally required to ensure a desired conjugate or shallow engagement with the sprocket teeth 16 by each of the ring and sun gears 24, 14, the sun gear 14 will be the weaker gear due to a lower total pitch count relative to the ring gear 24. This may be due to the greater total force or duration of force applications withstood by the each of the lower number of sun gear tooth forms 12 relative to the ring gear tooth forms 22 during speed and torque transformation operations. Thus, a lower-pitch count sun gear 14 may limit the strength and capacity of an entire prior art gear set below the capabilities of a stronger ring gear tooth/form 16a-22a interface.

In some embodiments of the present invention, the cylindrical sun gear tooth forms 12 have a different, longer body length 62 relative to a body length 64 of the ring gear cylindrical gear forms 22, which has been to increase the operational strength of the sun gear 14 to at least that of the ring gear 24 and remove or reduce for any inherent relative weakness due to decreased total pitch count of the sun gear 14 relative to the ring gear 24. This also enables the selection of a planetary sprocket gear involute tooth form 16 having a conjugate gear alignment with both of the sun and ring gear tooth forms 12, 22, for example where the respective ring and sun gear tooth form cylindrical diameters 60, 61 are common, or are relatively closer in value compared to a difference between the respective body lengths 62, 64.

Some embodiments achieve sun gear 14 strengthening relative to the ring gear 24 by providing for sun gear tooth form body lengths 62 at least about 150% of the ring gear tooth form length 64 when the respective tooth form cylindrical diameters 60, 61 are generally equivalent, and wherein the planetary sprocket teeth 16 are generally aligned to engage the sun gear cylindrical tooth forms 12 about the center points 66 of the body length 64. Exterior portions 65 and 67 each representing about 25% of the body length 64 extend on opposite sides of a central planetary sprocket gear tooth engaging portion 69 of the sun gear tooth form 12, the exterior portions 65 and 67 not engaging the planetary sprocket gear teeth 16 during operation of the gear set.

The present invention is not limited to the examples described herein. Other embodiments may choose alternative value differentials with respect to the body length 62, 64 and/or tooth form cylindrical diameters 60, 61. The engagement points along the sun and ring gear forms 12 and 22 may also vary; for example, engagement along a relatively longer sun gear form 12 may not be centered relative to the body length 62 but may be offset from the center point 66 or aligned to engage one of the end portions 65 or 67.

Figure 4:
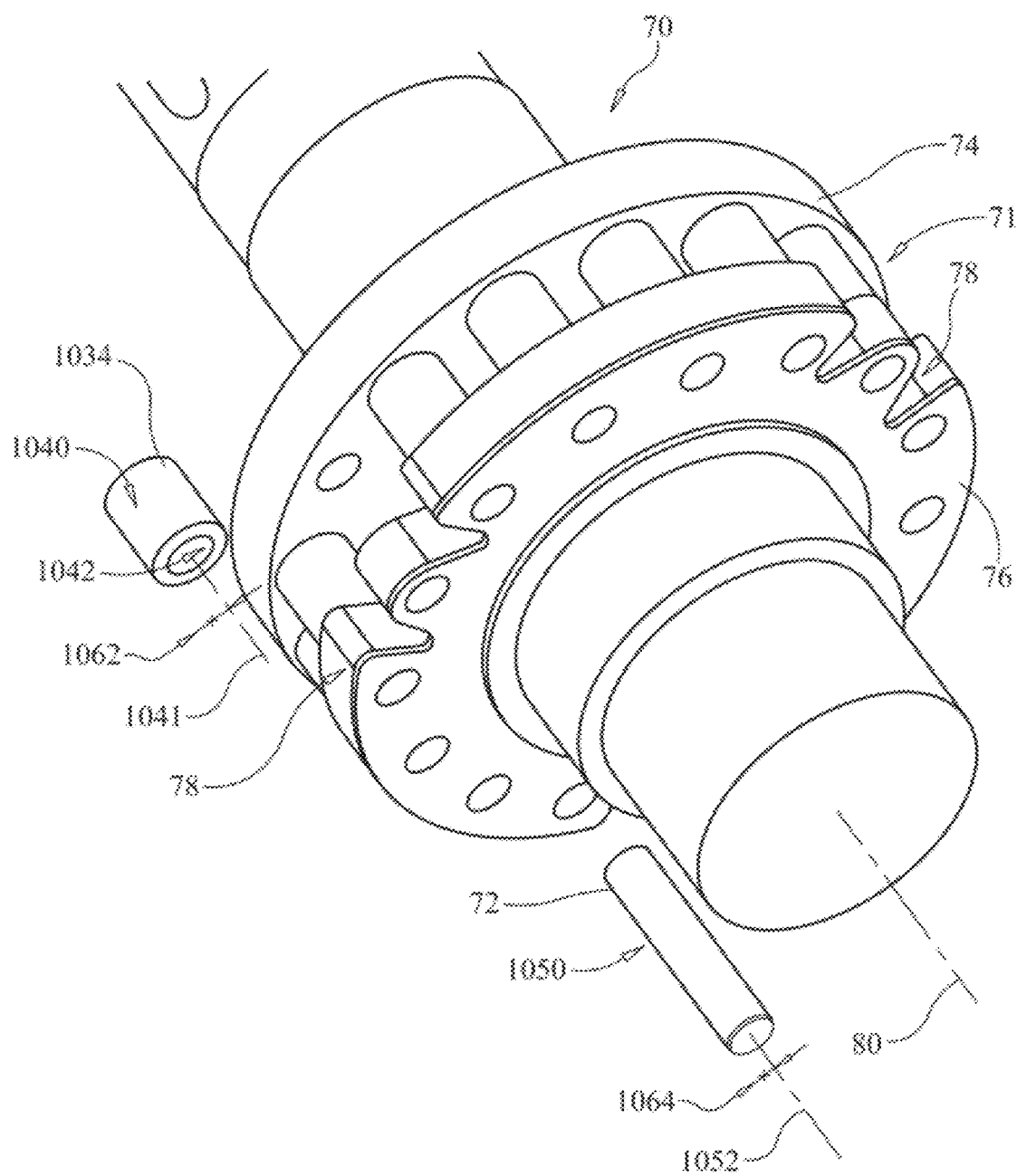
FIG. 4 illustrates gearing system components according to the present invention.

FIG. 4 illustrates another sun gear 70 according to the present invention having rollers 71 disposed about pins 72 fixed at either end into opposing plate members 74 and 76. Exemplary pin and roller gears are taught by U.S. Pat. No. 4,077,273 to Osborn, the entire disclosure of which is hereby incorporated. The embodiment shown in FIG. 4 also illustrates a sun gear assembly 70 machined in such fashion as to allow a plurality of sprockets (for example, three, though other pluralities may be practiced) to be assembled in an axial direction. More particularly, tooth shaped cut outs 78 formed in an opposing plate member 76 allow sprocket teeth clearance during assembly, which allows the sprockets to be pre-assembled onto their respective drive pins and carriage prior to axial engagement with the drive train's sun gear 70 and then slid into engagement in an axial direction (generally along the central driver axis 80) as will be readily appreciated by one skilled in the art. Although the present embodiment is a sun driver 70, other embodiments may be ring gears (not shown) wherein the tooth shaped cut outs formed in an opposing plate member also allow sprocket teeth clearance during assembly, wherein sprockets may be pre-assembled onto their respective drive pins and carriage prior to axial engagement with said ring gear and then slid into engagement therewith in an axial direction. Thus, a configuration and method of assembly wherein tooth shaped cut outs are formed in an opposing plate member of a sun or ring gear has been found to be beneficial in allowing simplification of the overall assembly method and process.

The use of roller chains for the sun gear form 12 or ring gear tooth forms 22 or 71 may provide for lubrication methods which enable a resultant gearing assembly to be an "uncased" assembly. More particularly, roller chains may be impregnated with their own lubricant as is well known in the art, which may remove requirements to encase an assembly in order to contain lubricants, such as gear oils. This may allow for substantial reduction in the cost of manufacturing, resulting in greatly increased production efficiencies over encased gear sets.

Alternative roller pin sun gear forms 12 or ring gear tooth forms 22 or 71 may also be provided. For example, it has been found that roller and pin assemblies may provide for improved operation lifetimes, and also for quieter operations in high-speed multi-stage speed reducer gearing applications, compared to roller chain assemblies. Accordingly, one embodiment of the sun gear roller form 71 of FIG. 4 may comprise cylindrical rollers 1034 disposed about and spaced from cylindrical pins 72 fixed at either end into the opposing plate members 74 and 76. It will also be understood that the roller 1034/pin 72 assemblies may also be used for gearing forms for the sun gear form 12 or the ring gear tooth form 22 in gear sets according to the present invention.

The cylindrical rollers 1034 have hardened and highly polished outer cylindrical surfaces 1040 defined from a roller body central axis 1041, and inner, softer interior cylindrical surface body 1042 also defined from the roller body central axis 1041. In assembly on the driver 70, the roller interior cylindrical surface 1042 is disposed about and spaced from a hardened and highly polished outer cylindrical pin surface 1050 defined from a pin body central axis 1052, wherein the central pin axes 1052 are generally aligned with the respective roller body central axes 1041 in said driver assembly 70.

The pins 72 may be formed from solid or tubing stock that is drawn and hardened, the outer cylindrical pin surfaces 1050 then highly polished, as will be understood by one skilled in the art. The rollers 1034 may be formed from low carbon seam tubing or other tubing material that is drawn and wherein the outer roller surface 1040 is hardened but the interior roller surface 1042 remains relatively softer and more readily accepting of a lubricant. In other embodiments, the roller 1034 has an outer roller surface 1040 formed from low carbon seam tubing or other tubing material that is drawn and hardened and polished, and a separate interior roller body 1042 is formed from drawn tubing but left unhardened, the interior surface of the separate interior roller body 1042 remaining relatively softer than the hardened outer body surface 1040. In some embodiments, there is a ten (10) point differential in hardness between the outer roller surface 1040 and the interior roller surface 1042. This hardness differential between the outer roller surface 1040 and the interior roller surface 1042 allows the interior surface to engage the hardened pin surface 1050 while also retaining lubrication more readily than the hardened surfaces 1040 and 1050, thus providing bushing-like lubrication functions.

The soft interior roller surface/body 1042 is defined on a roller interior surface radius 1062 from the roller central axis 1041. The hardened, polished outer pin surface 1050 is defined on a pin surface radius 1064 from the pin central axis 1052 which is smaller than the roller interior surface radius 1062, assuring a clearance between the pin outer surface 1050 and the roller interior surface/body 1042. In some embodiments, the differences between the pin surface radius 1064 and the roller interior surface radius 1062 range between about two to about four thousands of an inch. Said clearances have been found to provide for application of one or more lubricants to the interior roller surfaces/bodies 1042 sufficient to allow the rollers 1034 to freely rotate about the pins 72 in a gear set application (i.e. in engaging sprocket teeth under operative loading) and allow the omission of bushings there between. Thus, the roller 1034/pin 72 assembly according to the present invention provides for quiet operations in high speed applications with a longer service life than the conventional roller chain.

Bushings are typically required in conventional pin/roller and roller chain assemblies, for example in roller chain assemblies, to provide smooth rotation of the roller about the pin during operative engagement of other gears and reduce frictional wear on the rollers and their engaged sprocket tooth surfaces, thereby extending the operational life of each of the roller and engaged tooth elements. But as they are structurally softer or otherwise less robust than hardened roller and engaged tooth surfaces, they are commonly the point of failure during the operational life of conventional roller gear assemblies, wearing out and requiring replacement of the roller chain or other pin/roller assembly. By obviating the need for a bushing between the outer roller 1034 and central pin 72, wherein the interior roller surface/body 1042 is relatively softer and more retentive of lubricants than the hardened outer roller surfaces 1040 and highly polished outer cylindrical pin surfaces 1050, yet still more structurally robust than a typically soft bushing when it may be structurally incorporated as part of the stronger, drawn and hardened tube stock used to form the rollers 1034, the present invention provides for gear sets having longer operational lives compared to those conventional gear sets that require bushings.

In another aspect, sun and ring gears necessarily have divergent radii and pitch dimensions, as the sun gear has a much smaller radius and pitch due to its location encompassed by the surrounding, larger ring, typically both aligned with respect to a common central axis. Thus, in one aspect, solving for the pitch and radius of one of the sun and ring gears may often fail to provide an appropriate involute or otherwise an optimal tooth shape for engagement with the other. Accordingly, some conventional sprocket-and-roller gear planetary gear sets typically utilize different planetary gears to engage each of the sun and ring gears, which allows for differences in involute shape and/or teeth radii/pitches for the respective sun and ring gear planets. In contrast, some embodiments of the present invention teach a system and method for roller and sprocket planetary structures wherein the sun gear rollers may have a different diameter relative to the ring gear rollers, yet wherein one planetary sprocket gear form and array (as defined by the sprocket radius and the sprocket tooth pitch) is selected to engage both of the ring and sun gears with an involute tooth shape selected to optimize interaction with both of the divergent sun and ring gear roller diameters. In some embodiments, sun gear rollers may have a larger diameter relative to the ring gear rollers, thereby providing enhancing operative strength of the sun gear relative to the ring gears, in some examples equivalent to or even exceeding the strength of the ring gears. Thus, the present invention enables better load balancing between the ring and sun gear sprocket interfaces, in some embodiments enabling the capacity of the resultant gear set to be increased to that of the (conventionally stronger) ring gear.

Figure 5:
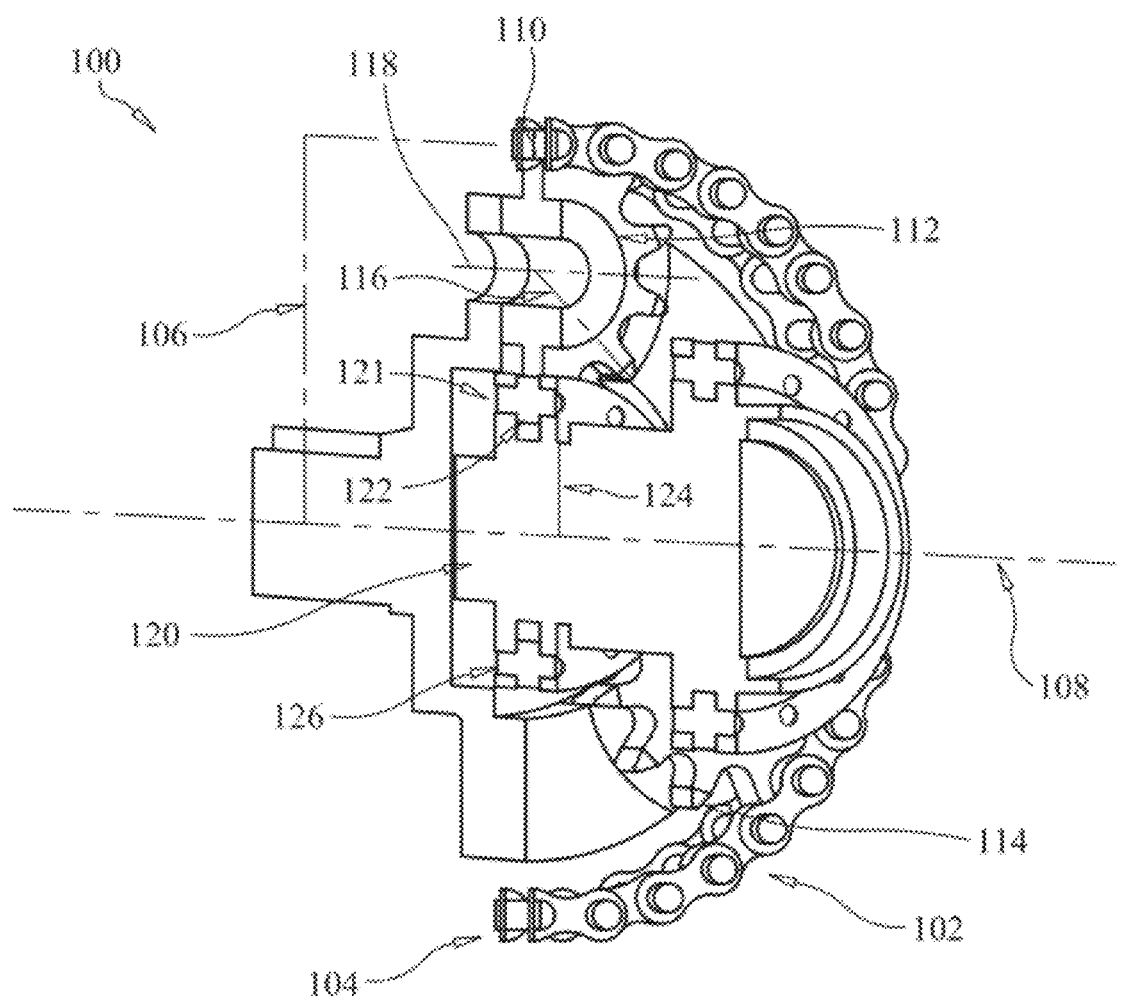
FIG. 5 illustrates another embodiment of a gearing system according to the present invention.

More particularly, FIG. 5 illustrates a perspective sectional view of a portion of a planetary gearing system 100 according to the present invention. For clarity of illustration, some elements of system 100 are omitted, such as bearings, input and output housings and elements, etc., but the application of such omitted elements will be readily apparent to one skilled in the art. A roller chain ring gear 102 comprises a first plurality of rollers 104 arrayed in a ring gear pitch on a ring gear radius 106 from a central axis 108, each of the first plurality of rollers having a common first roller diameter 110. In the present embodiment, the ring gear pitch is 36, meaning a total of 36 ring gear rollers are arrayed about the central axis 108 along the ring gear radius 106. Three planetary sprockets 112 are encompassed by the ring gear 102, each comprising a plurality of sprocket teeth 114 arrayed outward along a sprocket radius 116 from a central sprocket axis 118 in a sprocket tooth pitch and having a common involute gear shape. In the present embodiment, the sprocket tooth pitch is 12. The planetary sprockets are positioned for the sprocket teeth 114 to engage the ring gear rollers 104. A sun driver 120 is encompassed by the ring gear 102 and comprises a second plurality of rollers 122 disposed rotatably upon roller pins 121 and arrayed in a sun gear pitch less than the ring gear pitch, and on a sun gear radius 124 from the central axis 108 less than the ring gear radius. In the present embodiment, the sun gear pitch is 16. Each of the sun gear rollers 122 have a common second roller diameter 126 different from the ring gear roller diameter 110, the sun gear rollers 122 also positioned to engage the sprocket teeth 114.

The sprocket teeth 114 have a common involute gear shape, the shape and the sprocket tooth pitch selected to optimize a conjugate engagement of both of the ring gear rollers 104 and the sun gear rollers 122 as a function of the ring gear pitch, the sun gear pitch, the ring gear common roller diameter 110 and the sun gear common roller diameter 126. The planetary sprockets 112 are thereby configured to drive an output one of the sun gear 120 and the ring gear 102 at an output speed and torque about the central axis 108 different from an input speed and torque about the central axis 108 of an input other one of the sun gear 120 and the ring gear 102.

Figure 6:
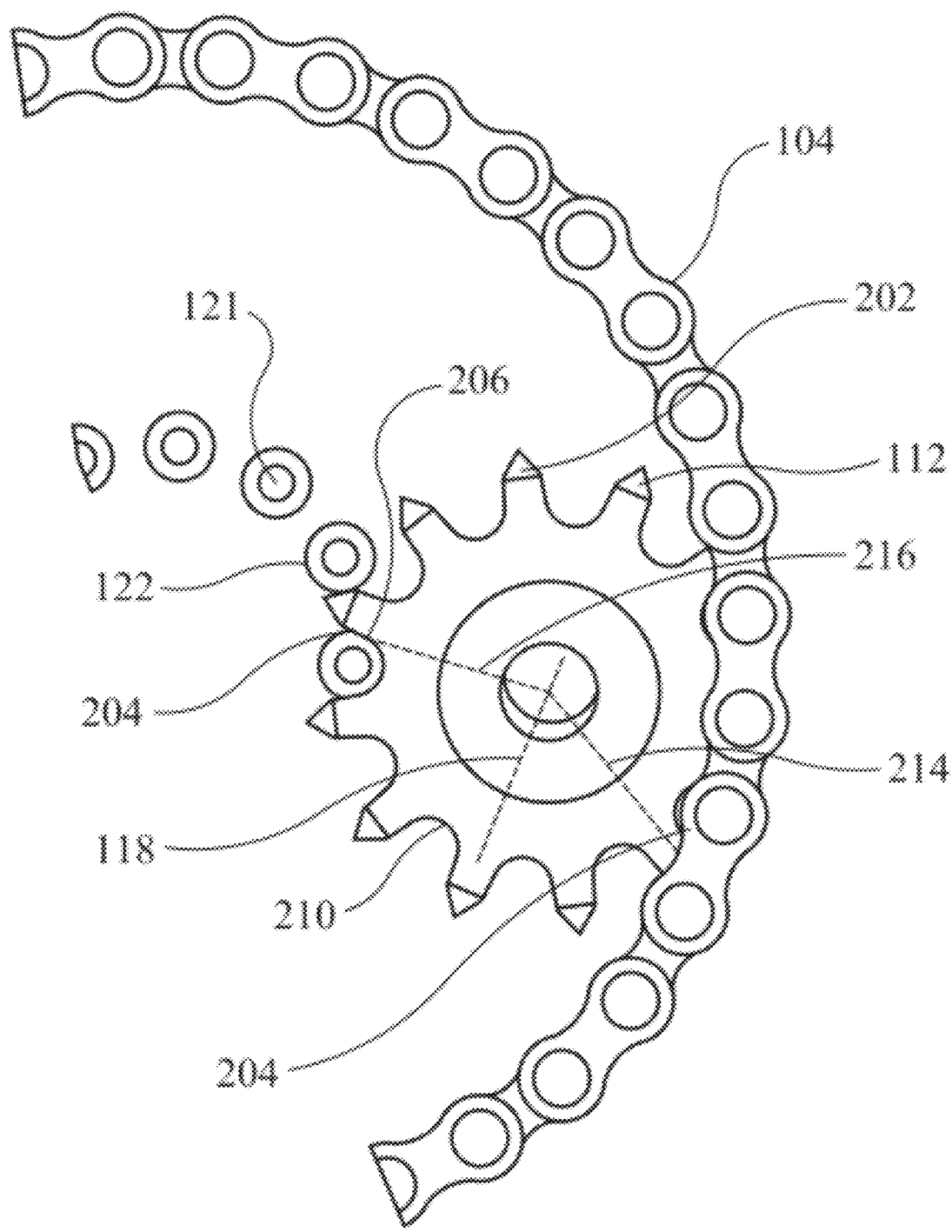
FIG. 6 illustrates views of components of the gearing system of FIG. 5.

Referring now to FIG. 6, as well as to FIG. 5, in operation the planetary sprockets 112 are aligned to rotate about their central sprocket axes 118 and with their sprocket teeth 114 drivingly engaging the ring gear rollers 104 substantially at a first roller contact point 204 located along the common involute gear shape 202 and drivingly engaging the sun gear rollers 122 substantially at a second roller contact point 206 located along the common involute gear shape different from the first roller contact point 204. The divergence between the different contact point locations 204 and 206 reflects a deeper penetration into the gullet 210 of the sprocket tooth form 202 of the larger of the sun gear roller 122 and the ring gear roller 104, in one aspect to enable the sprockets 112 to more fully and more forcefully engage said larger diameter roller, and thereby increase the amount of force transferred through said larger roller, relative to the other, smaller roller of the sun gear roller 122 and the ring gear roller 104.

Other embodiments according to the present invention may use different gear forms. It will be understood that either of the sun and ring gear rollers 104/122 may be provided within a roller chain (e.g. 102 of FIGS. 5 and 6), or they may be roller pins rotatably disposed upon pins (e.g. the rollers 122 on the pins 121), on bearings, bushings, lubricants, etc. Alternative planetary systems may also use fixed cylindrical gear teeth arrays, for example the hollow lobe embodiments of the forms 12, 22 discussed above, for either or both of the ring and sun gears 102/120 and thus in substitution of the respective sun and ring gear rollers 104/122. Some exemplary appropriate pin and roller ring gears are taught by U.S. Pat. No. 4,077,273 to Osborn. Moreover, the invention may also be practiced within many other types of gearing systems and gear tooth forms, and is not limited solely to the specific embodiments described herein. According to the present invention, otherwise conventionally disparate gear, sprocket, roller chain and pin gear elements may be chosen or built to function together in a conjugate manner and thereby perform required speed reduction, torque transmission or other power and speed transmission functions.

Some prior art, conventional gear set design assumes (or solves for) a minimum number of roller gears fully seated in the planetary sprocket gullets 210. However, according to the present invention, when the ring gear 102 rollers 104 or lobes 22 have a smaller diameter 110 relative to the sun gear roller 122 or lobes 12 diameters, this is not always the case. As the ratio of the ring gear roller/lobe diameter 110 relative to the sun gear roller/lobe diameter 126 decreases, the distance between the respective roller/lobe engagement contact points 204 and 206 for conjugate engagement by the involute tooth form 202 increases. Thus, in the present embodiment, the point of contact 206 for the larger sun gear roller 122/lobe 12 is closer to the sprocket axis 118 (located on a smaller radius 216 therefrom) than the point of contact 204 for the smaller ring gear roller 104/lobe 22, which is located on a larger radius 214 from the sprocket axis 118. This enables the larger sun gear roller 122/lobe 12 to be seated more completely within the tooth form gullet 210, which enables enhanced force engagement and transfer with respect to the fewer (sixteen) sun gear rollers 122/lobes 12 relative to the smaller yet more numerous (thirty-six) ring gear rollers 104/lobes 22.

In some embodiments, an amount of sprocket tooth 114 engagement by the ring gear rollers 104 or lobes 22 during load transfer may decrease (the radius/distance 214 of the contact point 204 from the sprocket axis 118 increasing), and the load contact change to a dynamic line contact between the planetary sprockets 112 and roller chain ring gear 102. Thus, according to some embodiments of the present invention, the planetary sprockets involute shapes 202 are selected with a tooth form adaptable for such a line contact interaction with the ring gear rollers 104 or lobes 22. The present invention, thus, also provides a method to design a sprocket tooth involute appropriate for line contact engagement between the planetary sprocket tooth ring gear rollers or tooth form lobes throughout a period of engagement, in one aspect minimizing the amplitude of load fluctuations and impact damage between the parts and thereby maximizing life and performance of the mechanical system as a whole.

While preferred embodiments of the invention have been described herein, variations in the design may be made, and such variations may be apparent to those skilled in the art of machine tooling, as well as to those skilled in other arts. The materials identified above are by no means the only materials suitable for the manufacture of the present invention, and substitute materials will be readily apparent to one skilled in the art. The scope of the invention, therefore, is only to be limited by the following claims.

What is claimed is:

1. A planetary gearing system, comprising:
 a ring gear comprising a first plurality of cylindrical tooth forms arrayed in a ring gear pitch on a ring gear radius from a central axis, each of the first plurality of cylindrical tooth forms having a common ring gear cylindrical form diameter;
 at least one planetary sprocket encompassed by the ring gear and comprising a plurality of sprocket teeth arrayed outward along a sprocket radius from a central sprocket axis in a sprocket tooth pitch and having a common involute gear shape, the at least one planetary sprocket positioned for the sprocket teeth to engage the ring gear cylindrical tooth forms;
 a sun driver encompassed by the ring gear and comprising a second plurality of cylindrical tooth forms arrayed in a sun gear pitch less than the ring gear pitch on a sun gear radius from the central axis less than the ring gear radius, each of the second plurality of cylindrical tooth forms having a common sun gear cylindrical form diameter, the sun gear cylindrical tooth forms positioned to engage the sprocket teeth; and
 wherein the at least one planetary sprocket is aligned for engagement of a specified at least one of the plurality of the sun gear cylindrical tooth forms and the plurality of the ring gear cylindrical tooth forms by the sprocket teeth at a contact radius from the central axis selected as a function of the sprocket tooth common involute gear shape, the sprocket radius, the sprocket tooth pitch, and of the pitch, gear radius and cylindrical form diameter of the selected at least one plurality of gear cylindrical tooth forms.

2. The system of claim 1 wherein the contact radius is selected for a conjugate engagement of the sprocket teeth by the specified at least one plurality of gear cylindrical tooth forms.

3. The system of claim 1 wherein the contact radius is selected for a shallow engagement of the sprocket teeth by the specified at least one plurality of the gear cylindrical tooth forms;
 wherein, if the specified at least one plurality of cylindrical tooth forms is the sun gear plurality of cylindrical tooth forms, the shallow engagement contact radius is greater than a conjugate contact radius defined by the sun gear cylindrical tooth forms relative to the central axis; and
 wherein, if the specified at least one plurality of cylindrical tooth forms is the ring gear plurality of cylindrical tooth forms, the shallow engagement contact radius is less than a conjugate contact radius defined by the ring gear cylindrical tooth forms relative to the central axis.

4. The system of claim 1 wherein the sun gear cylindrical forms each have a common body length greater than a common body length of each of the ring gear cylindrical forms; and
 wherein the at least one planetary sprocket is aligned to rotate about its central sprocket axis and with its sprocket teeth drivingly engage the sun gear cylindrical forms substantially at central planetary sprocket gear tooth engaging portions of the each sun gear tooth forms body length, with equal exterior portions of the sun gear cylindrical form body lengths extending outward on either side of the central planetary sprocket gear tooth engaging portions.

5. The system of claim 4 wherein the sun gear cylindrical form diameter body length is about 150% of the ring gear cylindrical form diameter body length.

6. The system of claim 5 wherein the equal sun body length exterior portion each represent about 25% of the sun gear cylindrical form diameter body length.

7. The system of claim 1 wherein at least one of the sun gear cylindrical tooth forms and the ring gear cylindrical forms are solid tooth forms having a hardened outer surface defined on a cross-sectional diameter selected as conjugate to the common involute gear shape of the at least one sprocket teeth.

8. The system of claim 7 wherein the solid tooth forms are hollow lobes having a central aperture defined therein.

9. The system of claim 1, wherein at least one of the ring gear and the sun driver further comprises:
 a plurality of pins fixed at either end into opposing plate members, and wherein the plurality of cylindrical tooth forms of the at least one of the ring gear and the sun driver are each disposed about each of said pins; and
 wherein at least one of the opposing plate members forms tooth shaped cut outs that allow for a clearance from the central planetary sprocket gear sprocket teeth during assembly, thereby allowing the sprockets to be pre-assembled onto respective drive pins and carriage prior to axial engagement with the sun gear cylindrical tooth forms, and slid into engagement with said sun gear cylindrical tooth forms in an axial direction generally along a central driver axis.

10. The system of claim 1, wherein the sprocket tooth common involute gear shape, sprocket radius and the sprocket tooth pitch are selected to optimize a conjugate engagement of both of the ring gear cylindrical tooth forms and the sun gear cylindrical tooth forms as a function of the ring gear pitch, the sun gear pitch, the ring gear common first cylindrical tooth form diameter and the sun gear common second cylindrical tooth form diameter; and wherein the at least one planetary sprocket is aligned to rotate about its central sprocket axis and with its sprocket teeth drivingly engaging the ring gear cylindrical tooth forms substantially at a first contact point located along the common involute gear shape and drivingly engaging the sun gear cylindrical tooth forms substantially at a second contact point located along the common involute gear shape different from the first contact point, the at least one planetary sprocket thereby driving an output one of the sun gear and the ring gear at an output speed and torque about the central axis different from an input speed and torque about the central axis of an input other one of the sun gear and the ring gear.

11. The system of claim 10 wherein an operative load of the planetary gearing system is balanced between the first roller contact point and the second roller contact point.

12. A method for forming a planetary sprocket, comprising:

providing a ring gear having a plurality of ring gear cylindrical tooth forms, each having a common ring gear outer surface diameter, the ring gear cylindrical tooth forms arrayed in a ring gear pitch on a ring gear radius;

providing a sun gear having a plurality of sun gear cylindrical tooth forms, each having a common sun gear outer surface diameter different from the ring gear outer diameter, the sun gear cylindrical tooth forms arrayed in a sun gear pitch different from the ring gear pitch and on a sun gear radius different from the ring gear radius; and providing a computer processor in communication with a memory comprising computer instructions, the computer processor configured by the instructions to determine a sprocket tooth involute form conjugate with both of the sun gear cylindrical tooth forms and the ring gear cylindrical tooth forms, a sprocket tooth pitch and a sprocket radius distance from a central sprocket axis in response to the ring gear outer surface diameter, the ring gear pitch, the ring gear radius, the sun gear outer surface diameter, the sun gear pitch and the sun gear radius.

13. The method of claim 12, wherein at least one of the ring gear cylindrical tooth forms and the sun gear cylindrical tooth forms have a gullet stalk length dimension; and wherein the computer processor is configured by the instructions to determine the sprocket tooth involute form conjugate with both of the sun gear cylindrical tooth forms and the ring gear cylindrical tooth forms as a function of the gullet stalk length dimension that has an extended involute length that is longer than an involute length determined as conjugate with the sun gear cylindrical tooth forms and the ring gear cylindrical tooth forms if they are both arrays of rollers.

\* \* \* \* \*